(12) United States Patent
Womack et al.

(10) Patent No.: US 8,446,856 B2
(45) Date of Patent: May 21, 2013

(54) SYSTEM AND METHOD FOR RELAY NODE SELECTION

(75) Inventors: James Earl Womack, Bedford, TX (US); Yi Yu, Irving, TX (US); Zhijun Cai, Euless, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 586 days.

(21) Appl. No.: 12/340,418

(22) Filed: Dec. 19, 2008

(65) Prior Publication Data

US 2010/0157845 A1    Jun. 24, 2010

(51) Int. Cl.
*H04W 4/00* (2009.01)

(52) U.S. Cl.
USPC ........ 370/322; 370/278; 370/310.2; 370/318; 370/328; 370/332

(58) Field of Classification Search
None
See application file for complete search history.

(56) References Cited

U.S. PATENT DOCUMENTS

| | | | |
|---|---|---|---|
| 6,014,375 A | 1/2000 | Janky | |
| 6,512,745 B1 | 1/2003 | Abe et al. | |
| 6,690,657 B1 | 2/2004 | Lau et al. | |
| 6,785,510 B2 | 8/2004 | Larsen | |
| 7,054,633 B2 * | 5/2006 | Seo et al. | 455/439 |
| 7,061,879 B2 | 6/2006 | Oprescu-Surcobe et al. | |
| 7,130,614 B2 * | 10/2006 | Sreemanthula et al. | 455/411 |
| 7,227,851 B1 | 6/2007 | Gopalakrishnan et al. | |
| 7,349,665 B1 | 3/2008 | Zhu et al. | |
| 7,386,036 B2 | 6/2008 | Pasanen et al. | |
| 7,564,827 B2 | 7/2009 | Das et al. | |
| 7,577,124 B2 | 8/2009 | Yomo et al. | |
| 7,602,843 B2 | 10/2009 | Cho et al. | |
| 7,673,211 B2 | 3/2010 | Meyer et al. | |
| 7,706,408 B2 | 4/2010 | Takagi et al. | |
| 7,724,767 B2 | 5/2010 | Oksman | |
| 7,742,448 B2 | 6/2010 | Ramachandran et al. | |
| 7,830,837 B2 | 11/2010 | Park et al. | |
| 7,873,002 B2 | 1/2011 | Cai | |
| 7,898,948 B2 | 3/2011 | DiGirolamo et al. | |
| 8,121,552 B2 | 2/2012 | Agami et al. | |
| 8,228,851 B2 | 7/2012 | Wu | |
| 2002/0155839 A1 | 10/2002 | Nisbet | |
| 2002/0187746 A1 | 12/2002 | Cheng et al. | |
| 2003/0096631 A1 | 5/2003 | Kayama et al. | |
| 2003/0103480 A1 | 6/2003 | You et al. | |
| 2004/0042492 A1 | 3/2004 | Suzuki et al. | |
| 2004/0063451 A1 * | 4/2004 | Bonta et al. | 455/519 |

(Continued)

FOREIGN PATENT DOCUMENTS

| | | | |
|---|---|---|---|
| EP | 1534035 A1 | 5/2005 | |
| EP | 1773091 A2 | 4/2007 | |

(Continued)

OTHER PUBLICATIONS

Cai, Zhijun, et al.; U.S. Appl. No. 12/916,214, filed Oct. 29, 2010; Title: System and Method for Autonomous Combining.

(Continued)

*Primary Examiner* — Jae Y Lee
(74) *Attorney, Agent, or Firm* — Conley Rose, P.C.; J. Robert Brown, Jr.

(57) ABSTRACT

A method for recommending a relay node to which a user agent attaches. The method includes recommending the relay node based on a relay node selection rank.

19 Claims, 4 Drawing Sheets

U.S. PATENT DOCUMENTS

| | | |
|---|---|---|
| 2005/0042987 A1 | 2/2005 | Lee et al. |
| 2005/0232212 A1* | 10/2005 | Kang et al. .................... 370/338 |
| 2006/0183421 A1 | 8/2006 | Proctor, Jr. et al. |
| 2007/0104148 A1 | 5/2007 | Kang et al. |
| 2007/0153734 A1 | 7/2007 | Lee et al. |
| 2007/0155315 A1 | 7/2007 | Lee et al. |
| 2007/0171925 A1 | 7/2007 | Tanimoto |
| 2007/0206531 A1 | 9/2007 | Pajukoski et al. |
| 2007/0253421 A1 | 11/2007 | Cai |
| 2008/0002610 A1 | 1/2008 | Zheng et al. |
| 2008/0025323 A1 | 1/2008 | Khan |
| 2008/0043671 A1 | 2/2008 | Moon et al. |
| 2008/0043710 A1 | 2/2008 | Zhou et al. |
| 2008/0081628 A1 | 4/2008 | Ye et al. |
| 2008/0089282 A1 | 4/2008 | Malladi et al. |
| 2008/0107076 A1 | 5/2008 | Ramachandran et al. |
| 2008/0107078 A1 | 5/2008 | Viorel et al. |
| 2008/0108303 A1 | 5/2008 | Okuda |
| 2008/0108304 A1 | 5/2008 | Suga |
| 2008/0159337 A1 | 7/2008 | Lee |
| 2008/0165776 A1 | 7/2008 | Tao et al. |
| 2008/0212513 A1 | 9/2008 | Tao et al. |
| 2008/0225765 A1 | 9/2008 | Marinier et al. |
| 2008/0225772 A1 | 9/2008 | Xu |
| 2008/0227461 A1 | 9/2008 | Dayal et al. |
| 2008/0232284 A1 | 9/2008 | Dalsgaard et al. |
| 2008/0232493 A1 | 9/2008 | Zhang et al. |
| 2008/0247375 A1 | 10/2008 | Muharemovic et al. |
| 2008/0285500 A1 | 11/2008 | Zhang et al. |
| 2008/0285501 A1 | 11/2008 | Zhang et al. |
| 2008/0293358 A1 | 11/2008 | Andersson et al. |
| 2008/0310389 A1 | 12/2008 | Suzuki et al. |
| 2009/0010199 A1 | 1/2009 | Adachi et al. |
| 2009/0046641 A1 | 2/2009 | Wang et al. |
| 2009/0061892 A1 | 3/2009 | Lee et al. |
| 2009/0111476 A1 | 4/2009 | Hamalainen et al. |
| 2009/0116423 A1 | 5/2009 | Ni et al. |
| 2009/0154533 A1 | 6/2009 | Khayrallah et al. |
| 2009/0190522 A1 | 7/2009 | Horn et al. |
| 2009/0191882 A1 | 7/2009 | Kovacs et al. |
| 2009/0196332 A1 | 8/2009 | Miyatani |
| 2009/0239568 A1 | 9/2009 | Bertrand et al. |
| 2009/0252079 A1 | 10/2009 | Zhang et al. |
| 2009/0264077 A1 | 10/2009 | Damnjanovic |
| 2009/0276672 A1 | 11/2009 | Lee et al. |
| 2009/0291679 A1 | 11/2009 | Wu |
| 2009/0303918 A1 | 12/2009 | Ma et al. |
| 2009/0313518 A1 | 12/2009 | Shen et al. |
| 2009/0325480 A1 | 12/2009 | Ji et al. |
| 2009/0325618 A1 | 12/2009 | Aiba et al. |
| 2010/0027457 A1 | 2/2010 | Okuda |
| 2010/0027458 A1 | 2/2010 | Wu et al. |
| 2010/0039947 A1 | 2/2010 | Li et al. |
| 2010/0046413 A1 | 2/2010 | Jin et al. |
| 2010/0046418 A1 | 2/2010 | Horn et al. |
| 2010/0056197 A1 | 3/2010 | Attar et al. |
| 2010/0061361 A1 | 3/2010 | Wu |
| 2010/0074209 A1 | 3/2010 | Montojo et al. |
| 2010/0091759 A1 | 4/2010 | Stahl et al. |
| 2010/0098045 A1 | 4/2010 | Miyazaki |
| 2010/0103845 A1* | 4/2010 | Ulupinar et al. .............. 370/254 |
| 2010/0120442 A1 | 5/2010 | Zhuang et al. |
| 2010/0131814 A1 | 5/2010 | Chiu |
| 2010/0135231 A1 | 6/2010 | Harada et al. |
| 2010/0135251 A1 | 6/2010 | Sambhwani et al. |
| 2010/0142433 A1 | 6/2010 | Womack et al. |
| 2010/0182992 A1 | 7/2010 | Chun et al. |
| 2010/0271999 A1 | 10/2010 | Yu et al. |
| 2010/0297993 A1 | 11/2010 | Heo et al. |
| 2010/0302998 A1 | 12/2010 | Bao et al. |
| 2010/0322145 A1 | 12/2010 | Yu et al. |
| 2010/0322194 A1 | 12/2010 | Hu et al. |
| 2010/0323612 A1 | 12/2010 | Xu et al. |
| 2010/0323614 A1 | 12/2010 | Yu et al. |
| 2010/0323684 A1 | 12/2010 | Cai et al. |
| 2010/0325506 A1 | 12/2010 | Cai et al. |
| 2011/0026409 A1 | 2/2011 | Hu et al. |
| 2011/0041027 A1 | 2/2011 | Fong et al. |
| 2011/0092212 A1 | 4/2011 | Kubota |
| 2011/0110258 A1 | 5/2011 | Ishii et al. |
| 2011/0261763 A1 | 10/2011 | Chun et al. |

FOREIGN PATENT DOCUMENTS

| | | |
|---|---|---|
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1940185 A1 | 7/2008 |
| EP | 1959708 A1 | 8/2008 |
| EP | 1995921 A2 | 11/2008 |
| JP | 2004328665 A | 11/2004 |
| JP | 2006311253 A | 11/2006 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118652 A | 5/2008 |
| JP | 2008167141 A | 7/2008 |
| JP | 2008172754 A | 7/2008 |
| JP | 2008172759 A | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009539299 A | 11/2009 |
| JP | 2010504665 A | 2/2010 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Office Action dated Jul. 12, 2010, 40 pages, U.S. Appl. No. 12/337,207, filed Dec. 17, 2008.

Notice of Allowance dated Nov. 8, 2010, 10 pages, U.S. Appl. No. 12/337,214, filed Dec. 17, 2008.

Office Action dated Aug. 17, 2010, 25 pages, U.S. Appl. No. 12/337,222, filed Dec. 17, 2008.

PCT International Preliminary Report on Patentability; PCT Application No. PCT/US2009/062571; Mar. 10, 2011; 8 pgs.

Office Action dated Jan. 25, 2011, 39 pages, U.S. Appl. No. 12/337,207, filed Dec. 17, 2008.

Notice of Allowance dated Mar. 25, 2011, 11 pages, U.S. Appl. No. 12/337,214, filed Dec. 17, 2008.

Final Office Action dated Jan. 14, 2011, 16 pages, U.S. Appl No. 12/337,222, filed Dec. 17, 2008.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
Womack, James Earl, et al.; U.S. Appl. No. 12/331,992, filed Dec. 10, 2008; Title: Method and Apparatus for Discovery of Relay Nodes.
Yu, Yi, et al.; U.S. Appl. No. 12/337,229, filed Dec. 17, 2008; Title: System and Method for Hybrid Automatic Repeat Request (HARQ) Functionality in a Relay Node.
Cai, Zhijun, et al.; U.S. Appl. No. 12/340,412, filed Dec. 19, 2008; Title: System and Method for Resource Allocation.
Yu, Yi, et al.; U.S. Appl. No. 12/337,207, filed Dec. 17, 2008; Title: System and Method for Multi-User Multiplexing.
Womack, James Earl, et al.; U.S. Appl. No. 12/337,235, filed Dec. 17, 2008; Title: System and Method for Initial Access to Relays.
Cai, Zhijun, et al.; U.S. Appl. No. 12/337,214, filed Dec. 17, 2008; Title: System and Method for Autonomous Combining.
Yu, Yi, et al.; U.S. Appl. No. 12/340,432, filed Dec. 19, 2008; Title: Multiple-Input Multiple Output (Mimo) with Relay Nodes.
Cai, Zhijun, et al.; U.S. Appl. No. 12/337,222, filed Dec. 17, 2008; Title: System and Method for a Relay Protocol Stack.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16jID9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16jID9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
PCT International Search Report; PCT Application No. PCT/US2009/030967; Sep. 8, 2009; 5 pgs.
PCT Written Opinion of the International Searching Authority; PCT Application No. PCT/US2009/030967; Sep. 8, 2009; 9 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
3GPP TS 36.331 v8.3.0; 3rd Generation Partnership Project; Technical Specification Group Radio Access Network; Evolved Universal Terrestrial Radio Access (E-UTRA); Multiplexing and Channel Coding; Release 8; Sep. 2008; 178 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.321 v8.3.0; 3rd Generation Partnership Porject; Technical Specification Group Radio Access Network; Evolved Universal Terrestrial Radio Access (E-UTRA) Medium Access Control (MAC) Protocol Specification; Release 8; Sep. 2008; 36 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Motorola; TSG-RAN WG1 #54; Title: Classification of Relays; R1-083223; Jeju, South Korea; Aug. 18-22, 2008; 3 pgs.

Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Ericsson; TSG-RAN WG1 #53; Title: A Discussion on Some Technology Components for LTE-Advanced; R1-082024; Kansas City, Missouri; May 5-9, 2008; 11 pgs.
3GPP TR 36.913 v1.0.0; 3rd Generation Partnership Project; Technical Specification Group Radio Access Network; Requirements for Further Advancements for E-UTRA (LTE-Advanced); Release 8; May 2008; 13 pgs.
Soldani, David et al.; Title: Wireless Relays for Broadband Access; IEEE Communications Magazine; Mar. 2008; pp. 58-66.
Pabst, Ralf et al.; Title: Relay-Based Deployment Concepts for Wireless and Mobile Broadband Radio; IEEE Communications Magazine; Sep. 2004; pp. 80-89.
3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.
Panasonic; 3GPP TSG RAN WG1 Meeting #54; Title: Discussion on the Various Types of Relays; R1-082397; Warsaw, Poland; Jun. 30-Jul. 4, 2008; 6 pgs.
Research in Motion, Limited; 3GPP TSG RAN WG1 Meeting #55; Title: L2 Relay Interference Mitigation; R1-084102; Prague, Czech Republic; Nov. 10-14, 2008; 6 pgs.
Research in Motion, Limited; 3GPP TSG RAN WG1 Meeting #55-bis; Title: Relay Control Signalling Resource Coordination; R1-090027; Ljubljana, Slovenia; Jan. 12-16, 2009; 3 pgs.
PCT International Search Report; PCT Application No. PCT/US2009/062551; Jan. 28, 2010; 4 pgs.
PCT Written Opinion of the International Searching Authority; PCT Application No. PCT/US2009/062551; Jan. 28, 2010; 5 pgs.
PCT Communication Relating to the Results of the Partial International Search; PCT Application No. PCT/US2009/062554; Mar. 2, 2010; 7 pgs.
PCT International Search Report; PCT Application No. PCT/US2009/062557; Feb. 10, 2010; 4 pgs.
PCT Written Opinion of the International Searching Authority; PCT Application No. PCT/US2009/062557; Feb. 10, 2010; 7 pgs.
PCT International Search Report; PCT Application No. PCT/US2009/062560; Mar. 1, 2010; 4 pgs.
PCT Written Opinion of the International Searching Authority; PCT Application No. PCT/US2009/062560; Mar. 1, 2010; 7 pgs.
PCT International Search Report; PCT Application No. PCT/US2009/062570; Feb. 22, 2010; 4 pgs.
PCT Written Opinion of the International Searching Authority; PCT Application No. PCT/US2009/062570; Feb. 22, 2010; 8 pgs.
PCT Communication Relating to the Results of the Partial International Search; PCT Application No. PCT/US2009/062571; Feb. 12, 2010; 6 pgs.
PCT International Search Report; PCT Application No. PCT/US2009/064398; Mar. 18, 2010; 5 pgs.
PCT Written Opinion of the International Searching Authority; PCT Application No. PCT/US2009/064398; Mar. 18, 2010; 9 pgs.
Rohde & Schwarz; "UMTS Long Term Evolution (LTE) Technology Introduction;" Application Note 1MA111; Sep. 2008; 55 pages.
Yu, Yi, et al.; U.S. Appl. No. 13/216,819, filed Aug. 24, 2011; Title: Multiple-Input Multiple-Output (MIMO) with Relay Nodes.
Cai, Zhijun, et al.; U.S. Appl. No. 13/221,583, filed Aug. 30, 2011; Title: System and Method for Autonomous Combining.
Final Office Action dated Dec. 9, 2011; U.S. Appl. No. 12/331,992, filed Dec. 10, 2008; 24 pgs.
Office Action dated Nov. 8, 2011; U.S. Appl. No. 12/340,412, filed Dec. 19, 2008; 19 pgs.
Office Action dated Sep. 16, 2011; U.S. Appl. No. 12/340,432, filed Dec. 19, 2008; 33 pgs.
Office Action dated Nov. 10, 2011; U.S. Appl. No. 13/216,819, filed Aug. 25, 2011; 19 pgs.
Cai, Zhijun, et al.; U.S. Appl. No. 13/221,584, filed Aug. 30, 2011; Title: System and Method for Autonomous Combining.
Office Action dated Aug. 19, 2011; U.S. Appl. No. 12/331,992, filed Dec. 10, 2008; 52 pgs.

Office Action dated Jun. 16, 2011; U.S. Appl. No. 121340,412, filed Dec. 19, 2008; 33 pgs.
Office Action dated Jul. 13, 2011; U.S. Appl. No. 12/337,207, filed Dec. 17, 2008; 34 pgs.
Office Action dated Jul. 22, 2011; U.S. Appl. No. 12/337,235, filed Dec. 17, 2008; 36 pgs.
Notice of Allowance dated May 27, 2011; U.S. Appl. No. 121337,214, filed on Dec. 17, 2008; 10 pgs.
Office Action dated Jul. 18, 2011; U.S. Appl. No. 12/340,432, filed Dec. 19, 2008; 6 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report on Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report on Patentability; PCT Application No. PCT/US2009/062557; Jun. 21, 2011; 7 pgs.
PCT International Preliminary Report on Patentability; PCT Application No. PCT/US2009/062560; Jun. 21, 2011; 8 pgs.
PCT International Preliminary Report on Patentability; PCT Application No. PCT/US2009/062570; Jun. 21, 2011; 9 pgs.
PCT International Preliminary Report on Patentability; PCT Application No. PCT/US2009/062574; Jun. 21, 2011; 10 pgs.
PCT International Preliminary Report on Patentability; PCT Application No. PCT/US2009/064398; Jun. 21, 2011; 10 pgs.
Office Action dated Feb. 17, 2012; U.S. Appl. No. 12/340,412, filed Dec. 19, 2008; 19 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Final Office Action dated Jan. 9, 2012; U.S. Appl. No. 12/337,235, filed Dec. 17, 2008; 26 pgs.
Office Action dated Feb. 1, 2012; U.S. Appl. No. 12/337,222, filed Dec. 17, 2008; 20 pgs.
Australian Office Action; Application No. 2009333788; Dec. 8, 2011; 3 pages.
Office Action dated Mar. 21, 2012; U.S. Appl. No. 12/337,229, filed Dec. 17, 2008; 49 pages.
Notice of Allowance dated Jun. 12, 2012; U.S. Appl. No. 12/337,207, filed Dec. 17, 2008; 20 pages.
Advisory Action dated Mar. 22, 2012; U.S. Appl. No. 12/337,235, filed Dec. 17, 2008; 10 pages.
Final Office Action dated Mar. 23, 2012; U.S. Appl. No. 12/340,432, filed Dec. 19, 2008; 28 pgs.
Final Office Action dated Apr. 19, 2012; U.S. Appl. No. 13/216,819, filed Aug. 25, 2011; 39 pgs.
Final Office Action dated Jun. 7, 2012; U.S. Appl. No. 12/337,222, filed Dec. 17, 2008; 16 pgs.
Australian Examination Report; Application No. 2009325082; Mar. 28, 2012; 3 pages.
European Examination Report; Application No. 09748915.7; May 14, 2012; 3 pages.
European Examination Report; Application No. 09761065.3; May 7, 2012; 4 pages.
Yu, Yi, et al.; U.S. Appl. No. 13/548,817, filed Jul. 13, 2012; Title: System and Method for Multi-User Multiplexing.
Notice of Allowance dated Aug. 28, 2012; U.S. Appl. No. 12/337,229, filed Dec. 17, 2008; 6 pages.
Notice of Allowance dated Aug. 10, 2012; U.S. Appl. No. 12/340,412, filed Dec. 19, 2008; 17 pgs.
Notice of Allowance dated Sep. 11, 2012; U.S. Appl. No. 12/337,235 filed Dec. 17, 2008; 16 pages.
Office Action dated Aug. 9, 2012; U.S. Appl. No. 12/916,214 filed Oct. 29, 2010; 51 pages.
Notice of Allowance dated Jun. 20, 2012; U.S. Appl. No. 12/340,432 filed Dec. 19, 2008; 23 pages.
Korean Office Action; Application No. Oct. 2011-7016626; Jul. 17, 2012; 7pages.
European Examination Report; Application No. 09756080.9; Jun. 15, 2012; 5 pages.
3GPP TSG RAN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity-Part I: System Description"; IEEE Transactions on Communications; vol. 51, No. 11; Nov. 2003; 12 pages.
Sendonaris, Andrew, et al.; "User Cooperation Diversity - Part II: Implementation Aspects and Performance Analysis"; IEEE Transactions on Communications; vol. 51, No. 11; Nov. 2003; 10 pages.
Office Action dated Oct. 12, 2012; U.S. Appl. No. 13/548,807, filed Jul. 13, 2012; 53 pages.
Final Office Action dated Nov. 27, 2012; U.S. Appl. No. 12/916,214, filed Oct. 29, 2010; 16 pages.
Office Action dated Dec. 3, 2012; U.S. Appl. No. 12/337,222, filed Dec. 17, 2008; 24 pgs.
Japanese Office Action; Application No. 2011-540716; Oct. 4, 2012; 15 pages.
Korean Office Action; Application No. Oct. 2011-7015882; Sep. 18, 2012; 10 pages.
Japanese Office Action; Application No. 2011-542161; Nov. 1, 2012; 17 pages.
Korean Office Action; Application No. Oct. 2011-7016626; Oct. 26, 2012; 8pages.
Japanese Office Action; Application No. 2011-542162; Oct. 17, 2012; 10 pages.
Japanese Office Action; Application No. 2011-542164; Oct. 26, 2012; 7 pages.
Japanese Office Action; Application No. 2011-542165; Oct. 26, 2012; 7 pages.
Korean Office Action; Application No. Oct. 2011-7016425; Oct. 30, 2012; 9 pages.
Japanese Office Action; Application No. 2011-542177; Oct. 26, 2012; 10 pages.
Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.
PCT International Search Report; PCT Application No. PCT/US2009/062554; May 12, 2010; 6 pgs.
PCT Written Opinion of the International Searching Authority; PCT Application No. PCT/US2009/062554; May 12, 2010; 7 pgs.
PCT International Search Report; PCT Application No. PCT/US2009/062571; Apr. 19, 2010; 6 pgs.
PCT Written Opinion of the International Searching Authority; PCT Application No. PCT/US2009/062571; Apr. 19, 2010; 6 pgs.
PCT Communication Invitation to Pay Additional Fees and, Where Applicable, Protest Fee; PCT Application No. PCT/US2009/062574; Apr. 22, 2010; 8 pgs.
Office Action dated May 26, 2010, 20 pages, U.S. Appl. No. 12/337,214, filed on Dec. 17, 2008.
Yu, Yi, et al.; U.S. Appl. No. 13/842,584, filed Mar. 15, 2013; Title: System and Method for Hybrid Automatic Repeat Request (HARQ) Functionality in a Relay Node.
Advisory Action dated Apr. 12, 2013; U.S. Appl. No. 13/548,817, filed Jul. 13, 2012; 8 pages.
Korean Office Action; Application No. 10-2011-7015882; Mar. 21, 2013; 7 pages.

* cited by examiner

SYSTEM AND METHOD FOR RELAY NODE SELECTION

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access device" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node or other relay node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
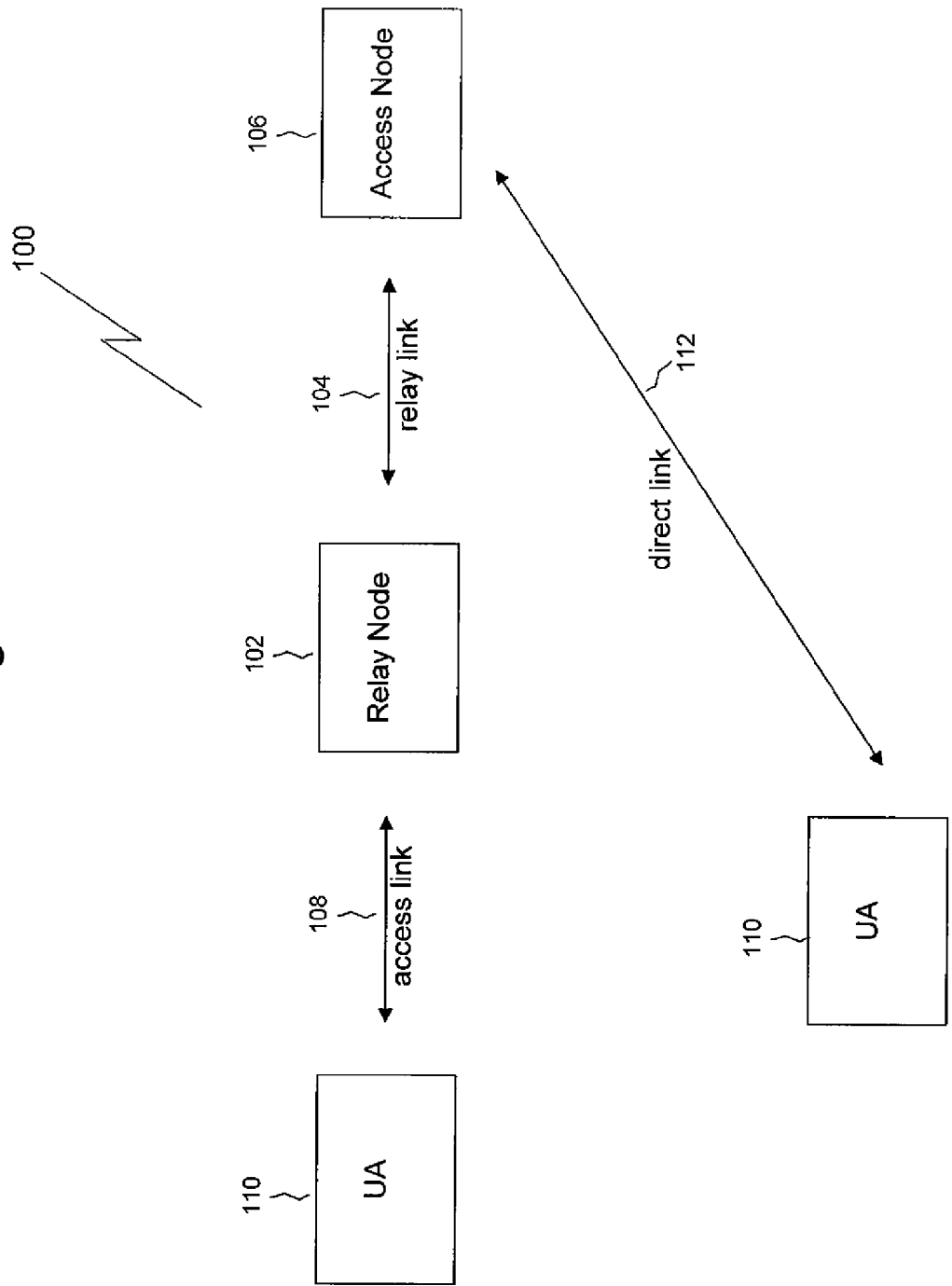
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, power level, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate or a lower power transmission than the UA 110 might use when communicating directly with the access node 106 for that cell. Transmission at a higher data rate creates higher spectrum efficiency, and lower power benefits the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) or other relay node to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

Figure 2:
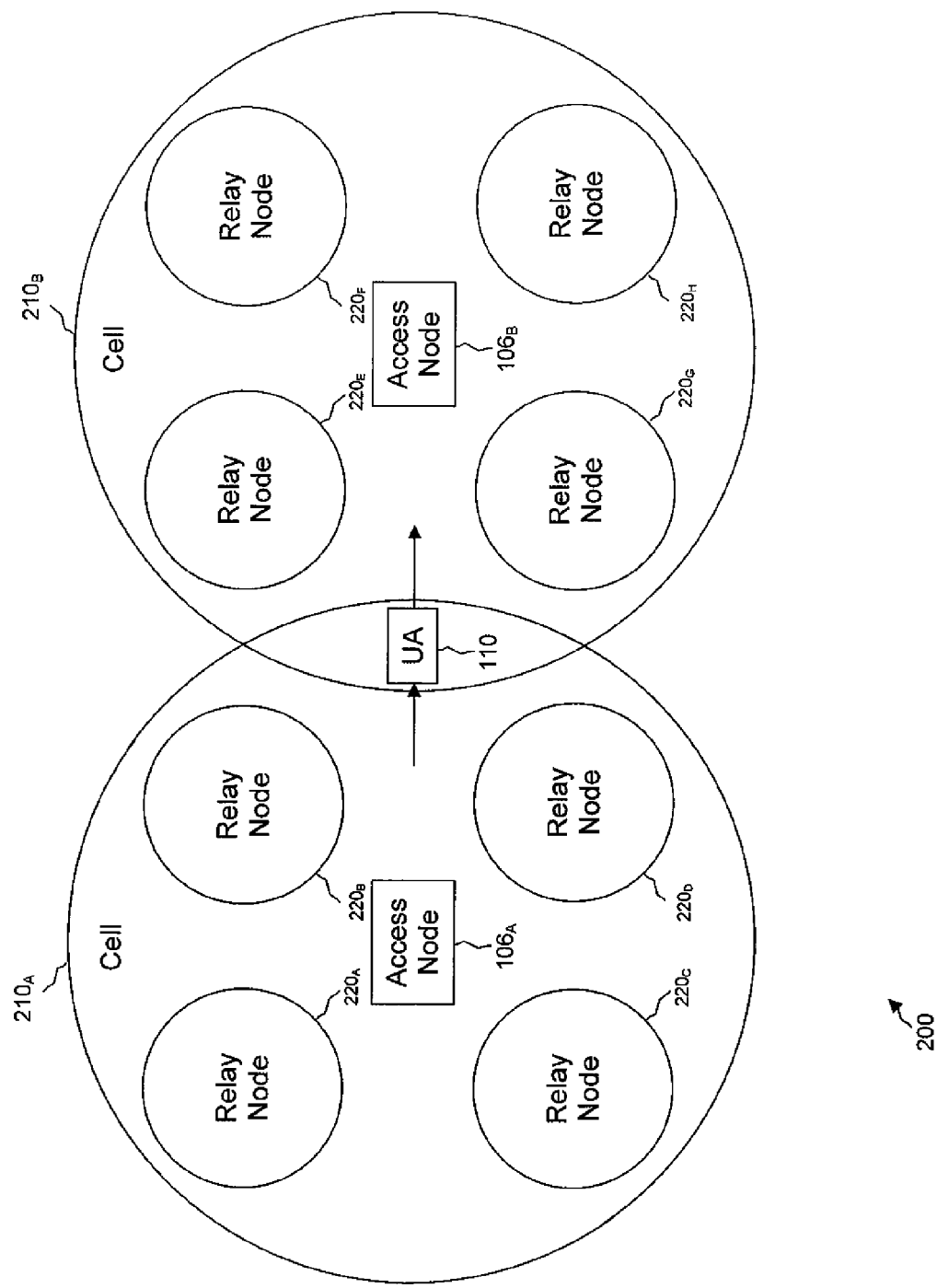
FIG. 2 is a diagram illustrating another wireless communication system that includes a relay node, according to an embodiment of the disclosure.

The UA 110 might be a mobile device that can move from one cell to another. FIG. 2 illustrates a system 200 in which the UA 110 is moving from a first cell $210_A$ covered by a first access node $106_A$ to a second cell $210_B$ covered by a second access node $106_B$. As the UA 110 moves from the first cell $210_A$ to the second cell $210_B$, the UA 110 might be handed over from the first access node $106_A$ to the second access node $106_B$. Also, as the UA 110 moves within one of the cells 210, the access node 106 for that cell 210 might cause the UA 110 to switch from one carrier to another, from one frequency to another, and/or from one radio access technology (RAT) to another.

Each of the cells 210 contains a plurality of relay nodes 220. While four relay nodes 220 are shown in each of the cells 210, other numbers of relay nodes 220 could be present, and while the areas covered by the relay nodes 220 are not depicted overlapping, the relay node coverage areas might overlap. When the UA 110 is attached to one of the access nodes 106 via one of the relay nodes 220 and moves out of the coverage area of that relay node 220, the UA 110 might need to attach to the same access node 106 via another relay node 220 or to another access node 106 via another relay node 220.

When a UA is in a cell that has relay nodes, it is sometimes preferable that the UA connect to the cell's access node via a relay node rather than over a direct link. U.S. patent application Ser. No. 12/331,992, filed Dec. 10, 2008, by James Earl Womack, et al, entitled "Method and Apparatus for Discovery of Relay Nodes", which is incorporated herein by reference as if reproduced in its entirety, discusses how a UA can discover that one or more relay nodes are nearby. The present disclosure deals with techniques for the UA to evaluate the discovered relay nodes and recommend a relay node to which the UA prefers to attach.

In an embodiment, the behavior of a moving UA differs depending on whether the UA is in the idle mode or in the connected mode. UA behavior in the idle mode will be considered first. The UA can save battery life by entering the idle mode in which it reduces its communications with an access node and monitors a signal that the access node provides. The UA can also monitor the power levels of other cells to determine whether it should reselect one of the other cells. An access node can page the UA when the access node needs to initiate communication with the UA, and the UA might then move from the idle mode (or idle state) to the connected mode (or connected state).

In an embodiment, while in the idle mode, the UA determines the signal strengths and related parameters of nearby relay nodes and uses this information to recommend which relay node the UA prefers to attach to when the UA moves from the idle mode to the connected mode. The UA sends its recommendation to an access node, and the access node can decide to accept or reject the recommendation.

The relay nodes may not send broadcast signals, but they typically do send reference symbols on the downlink to the UA. Two measurements have been standardized that measure the power of reference symbols. One is reference signal receive power (RSRP), and the other is reference signal receive quality (RSRQ). RSRP is a linear average of the received power of the cell-specific reference symbols. RSRQ is the ratio of RSRP and carrier received signal strength indication (RSSI).

In an embodiment, the UA does not use these measurements alone to evaluate the relay nodes. Instead, these measurements, or a subset thereof, might be combined with various parameters provided to the UA by an access node to derive a relay node selection rank. For example, the following parameters might be used in any combination to derive the relay node selection rank: an indication of preference or priority, a power offset value, a hysteresis value, an identifier of specific relay nodes, or any metadata about a relay node.

The preference or priority parameter can refer to a relay node that may be preferable for the UA to attach to, even when other nearby relay nodes have higher signal strengths or other parameters that may seem favorable. For example, a relay node in a high traffic area such as an airport terminal might have a higher signal strength than other nearby relay nodes. However, to prevent overloading the relay node, it may be preferable that some UAs attach to the other, lower power relay nodes. The relay node in the high traffic area might be assigned a preference or priority parameter that decreases the likelihood that a UA will attach to it.

The power offset parameter can refer to the difference in signal strength between two neighboring relay nodes. When other factors are not considered, a UA will generally tend to attach to a relay node that has a higher signal strength than nearby relay nodes. For example, when a UA attaches to a relay node, in one embodiment it is more efficient for the UA to stay in the current serving relay node unless a neighboring relay node can provide a higher signal strength. In order for the switch to the neighboring node to be worth the reconfiguration costs, the neighboring node's signal strength needs to be higher than the serving node's signal strength by a set amount, i.e., the power offset parameter. The power offset parameter can be set to zero in some cases.

The hysteresis value is a parameter that can prevent a UA from frequently switching back and forth between relay nodes. Due to vagaries in the strengths of relay node signals, a signal from one relay node that, at most times, is stronger than the signal from another relay node might occasionally be surpassed in strength by the other signal. If a UA always attached to the relay node with the higher signal strength, the UA might repeatedly alternate the relay node to which it attaches as the relay node with the higher signal strength alternates. To prevent this, a hysteresis value can be specified for a plurality of signal strengths such that a UA detaches from a first relay node and attaches to a second relay node only when the signal strength of the second relay node exceeds the signal strength of the first relay node for a specified number of consecutive measurements, throughout a specified length of time, or over some other hysteresis range. In one embodiment, when the signal strength of the neighboring node exceeds the signal strength of the serving node by the power offset for the time specified by the hysteresis value, the UA will detach from the serving node and attach to the neighboring node.

Upon determining the relay node power and receiving these parameters from an access node for a plurality of relay nodes, the UA can calculate a relay node selection rank for each of the relay nodes, determine the relay node with the highest relay node selection rank, and inform the access node that the UA would prefer to attach to the relay node with highest relay node selection rank upon leaving the idle mode. That is, an equation such as the following might be calculated in the UA for each nearby relay node:

$$RN\_Reselect(RN)=RSRP(RN)+Preference(RN)+PowerOffset(RN)+Hysteresis$$

where RN_Reselect(RN) is the relay node selection rank, RSRP(RN) is the measured relay node power, Preference (RN) is the preference or priority parameter for the relay node, PowerOffset(RN) is the power offset parameter for the relay node, and Hysteresis is the hysteresis parameter for the relay node. Although Preference(RN), PowerOffset(RN), and Hysteresis are described here to be associated with a particular relay node, other possibilities exist. For example, Preference(RN), PowerOffset(RN), and Hysteresis may be associated with the access node associated with the relay node.

Further, it should be understood that RN_Reselect(RN) is not necessarily calculated by a simple addition as shown in the equation, but might be some other combination of data related to one or more of RSRP(RN), Preference(RN), PowerOffset(RN), and Hysteresis. For example, any of these parameters might be converted to a measurement unit that is compatible with the other parameters, or any of these parameters might be multiplied by a weighting factor to give the parameter a greater or lesser significance. The weighting factor of any of the parameters could be set to zero, thus eliminating the parameter from consideration. That is, a subset of the parameters could be used. Also, in other embodiments, other factors might be considered than those above, or other combinations of factors might be considered. An access node might provide the Preference(RN), PowerOffset(RN), and Hysteresis values to the UA through RRC signaling or on a broadcast channel.

To save battery life, an idle UA typically communicates with the network only when the UA moves out of a location so that the UA can be paged if needed in its new location. However, this may not be an appropriate time to report relay node power levels and related information, since the reported power level information is only relevant when the UA moves into the connected mode from the idle mode. In an embodiment, the identity of the relay node that the UA prefers based on the RN_Reselect(RN) value is reported to the access node when the UA is changing from the idle mode to the connected mode. In an embodiment, the identity of the relay node is included in an RRC Connection Setup Complete message or another relevant RRC uplink message that the UA sends to the access node.

When the UA is in the connected mode, a similar relay node measurement procedure and relay node ranking procedure may be applied. This could be initiated by a Radio Resource Control message from the network node or by a mode change of the UA (i.e., switching from the idle mode to the connected mode). For example, when the UA switches from the idle mode to the connected mode, the UA could start to monitor nearby relay nodes and perform a relay node ranking procedure. The UA could then report the results to a network node, i.e., the access node. In one embodiment, the UA recommends a relay node to which to attach based on the ranking procedure and reports the recommended relay node to the access node. The access node may or may not override the UA's recommendation. In another embodiment, the UA reports the candidates and their relative ranking, and the access node selects the relay node to which the UA connects. In an embodiment, a Measurement Report message is used for the UA's reporting. In the connected mode, the UA may continue monitoring the relay nodes and perform the ranking procedure and update the recommended relay node. Alternatively, the UA may monitor the nearby relay nodes only when it switches from the idle mode to the connected mode.

In an embodiment, when the UA is in the connected mode and attached to a relay node, the UA is not handed over from the relay node to another relay node, another cell, another network, another frequency, or another RAT. Instead, the UA is first handed over from the relay node to the access node associated with the relay node. The access node then hands the UA over to the other relay node, cell, network, frequency, or RAT. When the UA is handed over to another relay node, the relay node to which the UA is handed over might be selected based on the relay node selection rank as described above. In an example signaling flow, the access node first sends a Measurement Control Message to the UA, which may include the IDs of the nearby relay nodes, measurement configurations, etc. Then the UA may perform the measurement procedures and, based on the ranking procedure, the UA may send a Handover Request message to the access node which may include the ID of the candidate relay node that the UA wishes to switch to. After the access node receives the Handover Request message, the access node may accept the relay node handover request and send a Handover Command to the UA. Then the UA may start to access the target relay node using the information provided in the Handover Command message.

In another embodiment, when the UA is in the connected mode, the UA is handed over from a relay node directly to another relay node, another cell, another network, another frequency, or another RAT. In an example signaling flow, after the UA performs the relay node ranking and a target relay node is selected, the UA may directly access the target relay node. After the target relay node receives an access message, the target relay node may notify the access node and, if the access node accepts the handover, the target relay node will send an access response to the UA indicating the successful relay handover.

Figure 3A:
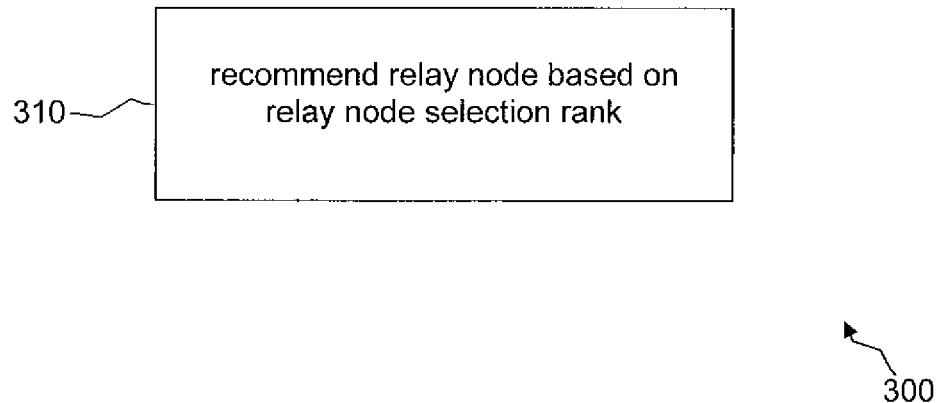
FIG. 3a is a block diagram of a method for recommending a relay node to which a user agent attaches according to an embodiment of the disclosure.

FIG. 3a illustrates an embodiment of a method 300 for recommending a relay node to which a UA attaches. In block 310, a relay node is recommended based on a relay node selection rank.

Figure 3B:
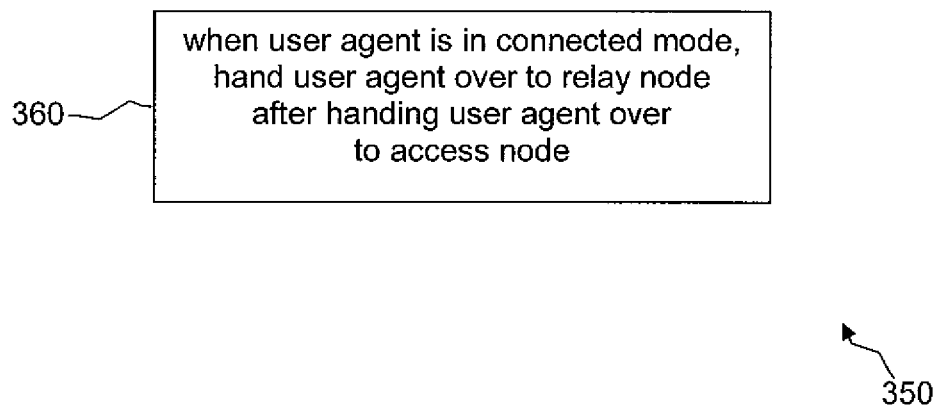
FIG. 3b is a block diagram of an alternative method for recommending a relay node to which a user agent attaches according to an embodiment of the disclosure.

FIG. 3b illustrates an embodiment of an alternative method 350 for recommending a relay node to which a UA attaches. In block 360, when the UA is in the connected mode, the UA is handed over to the relay node after the UA is handed over to an access node.

Figure 4:
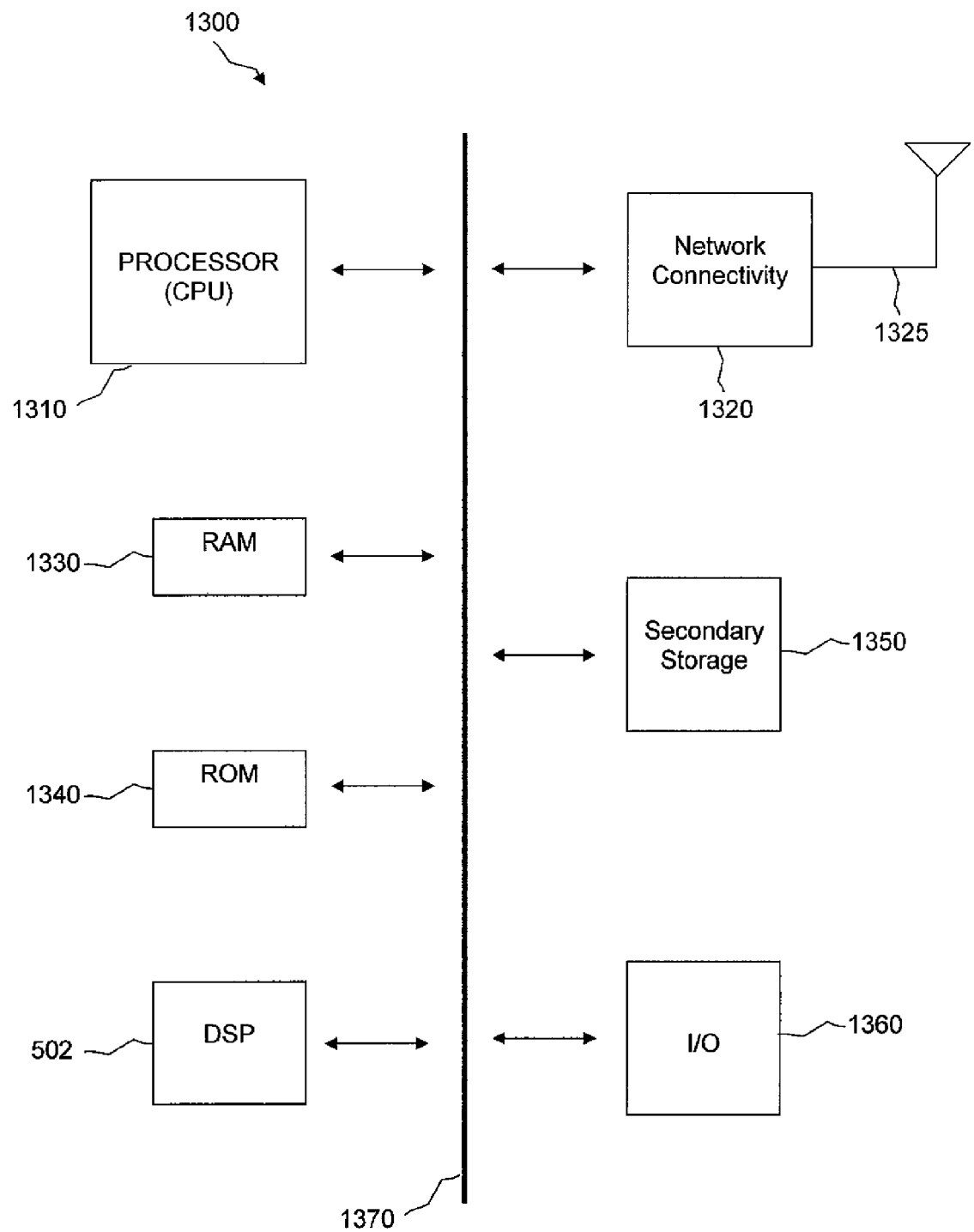
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 502. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

In an embodiment, a method is provided for recommending a relay node to which a user agent attaches. The method includes recommending the relay node based on a relay node selection rank.

In another embodiment, another method is provided for recommending a relay node to which a user agent attaches. The method includes, when the user agent is in a connected mode, handing the user agent over to the relay node after handing the user agent over to an access node.

In another embodiment, a user agent is provided that includes a processor configured to recommend a relay node based on a relay node selection rank.

In another embodiment, a wireless communication system is provided. The system includes a component configured to receive an identity of a relay node recommended based on a relay node selection rank and to promote attaching a user agent to the relay node.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for operating a user agent in a wireless communication network, the method comprising:
   calculating, by a user agent, a relay node selection rank for a plurality of relay nodes based on an equation of RN Reselect (RN)=RSRP (RN)+Preference (RN)+PowerOffset (RN)+Hysteresis,
   wherein RN Reselect (RN) is the relay node selection rank, RSRP (RN) is measured relay node power, Preference (RN) is preference or priority parameter for relay node, PowerOffset (RN) is power offset parameter for relay node, and Hysteresis is hysteresis parameter for relay node;
   ranking, by the user agent, the plurality of relay nodes based on the calculated ranks;
   selecting, by the user agent, a relay node from the plurality of relay nodes based at least partly on the relay node selection ranks as ranked by the user agent; and
   recommending, by the user agent, the relay node to an access node in the wireless communication network.

2. The method of claim 1, wherein recommending the relay node from the plurality of relay nodes comprises recommending a relay node with highest relay node selection rank.

3. The method of claim 1, wherein recommending the relay node comprises informing an access node associated with the relay node of the recommendation.

4. The method of claim 3, wherein recommending the relay node comprises informing the access node of the recommendation in an Radio Resource Control (RRC) Connection Setup Complete message.

5. The method of claim 1, further comprising receiving at least one of the preference parameter, the power offset parameter, and the hysteresis parameter from the access node in at least one of:
   radio resource control signaling; and
   a broadcast channel.

6. The method of claim 1, wherein recommending the relay node comprises recommending the relay node based on the relay node selection rank when at least one of the following conditions occurs:
   the user agent switches from an idle mode to a connected mode; and
   the user agent receives a message from the access node to trigger the relay node rank recommendation procedure.

7. The method of claim 1, wherein the user agent is in an idle mode.

8. The method of claim 1, wherein when the user agent is in a connected mode, handing the user agent over to the recommended relay node after handing the user agent over to an access node.

9. The method of claim 1, wherein the user agent detaches from a first relay node and attaches to a second relay node only when signal strength of the second relay node exceeds signal strength of the first relay node by a power offset parameter for a predetermined number of consecutive signal strength measurements or throughout a predetermined length of time.

10. A user agent comprising:
    a processor configured to:
       calculate a relay node selection rank for a plurality of relay nodes, based on an equation of RN Reselect (RN)=RSRP (RN)+Preference (RN)+PowerOffset (RN)+Hysteresis,
    wherein RN Reselect (RN) is the relay node selection rank, RSRP (RN) is measured relay node power, Preference (RN) is preference or priority parameter for relay node, PowerOffset (RN) is power offset parameter for relay node, and Hysteresis is hysteresis parameter for relay node;
    rank the plurality of relay nodes based on the calculated ranks;
    select a relay node from the plurality of relay nodes based at least partly on the relay node selection ranks as ranked by the user agent; and
    recommend the relay node to an access node.

11. The user agent of claim 10, wherein the user agent recommends the relay node with highest relay node selection rank.

12. The user agent of claim 10, wherein the user agent informs an access node associated with the relay node of the recommendation.

13. The user agent of claim 12, wherein the user agent informs the access node of the recommendation in an Radio Resource Control (RRC) Connection Setup Complete message.

14. The user agent of claim 10, wherein the user agent receives at least one of the preference parameter, the power offset parameter, and the hysteresis parameter from the access node in at least one of:
    radio resource control signaling; and
    a broadcast channel.

15. The user agent of claim 10, wherein the processor is configured to recommend the relay node based on the relay node selection rank when at least one of the following conditions occurs:
    the user agent switches from an idle mode to a connected mode; and
    the user agent receives a message from the access node to trigger the relay node rank recommendation procedure.

16. The user agent of claim 10, wherein the processor is further configured, when the user agent is in a connected mode and attached to a first relay node, to promote handing the user agent over to a second relay node after the user agent is handed over to an access node.

17. The user agent of claim 16, wherein the second relay node is recommended based on the relay node selection rank.

18. The user agent of claim 10, wherein the user agent is in an idle mode.

19. The user agent of claim 10, wherein the user agent detaches from a first relay node and attaches to a second relay node only when signal strength of the second relay node exceeds signal strength of the first relay node by a power offset parameter for a predetermined number of consecutive signal strength measurements or throughout a predetermined length of time.

* * * * *